Aug. 12, 1930. A. O. GYLLING 1,772,935
LAMINATED SPRING
Filed April 30, 1928 2 Sheets-Sheet 1

Inventor:
Åke Oskar Gylling
by
George Bayard Jones,
Attorney.

Aug. 12, 1930.  A. O. GYLLING  1,772,935
LAMINATED SPRING
Filed April 30, 1928  2 Sheets-Sheet 2
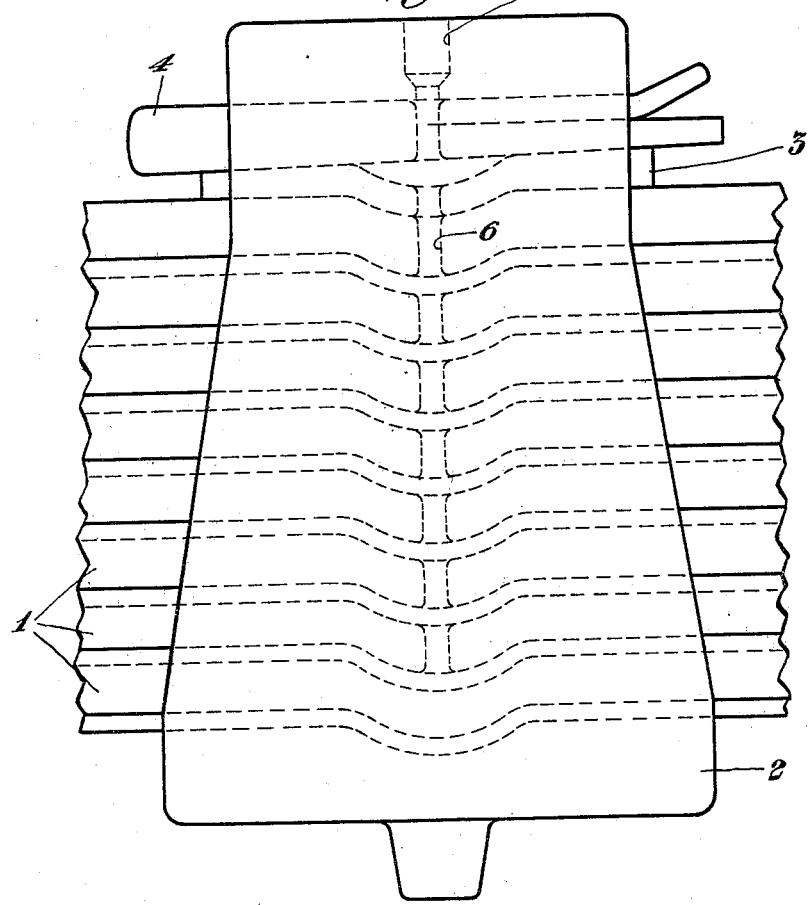
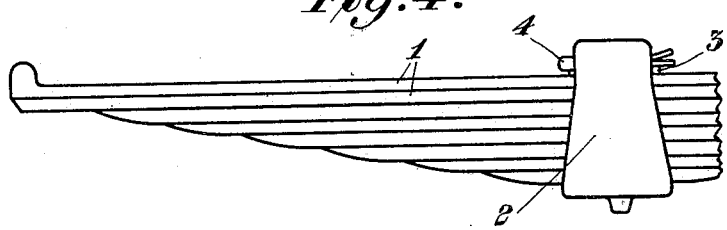
Inventor:
Åke Oskar Gylling
by George Bayard Jones
Attorney.

Patented Aug. 12, 1930

1,772,935

UNITED STATES PATENT OFFICE

ÅKE OSKAR GYLLING, OF STOCKHOLM, SWEDEN, ASSIGNOR TO AKTIEBOLAGET SVENSKA SPIRALFABRIKEN, OF STOCKHOLM, SWEDEN, A COMPANY OF SWEDEN

LAMINATED SPRING

Application filed April 30, 1928, Serial No. 274,130, and in Sweden May 3, 1927.

The present invention relates to an improvement in such laminated supporting springs which consist of two or more spring leaves or plates placed on top of one another, and in which the upper spring plate of a pair of adjacent or contacting plates is provided in its lower face with a longitudinal groove which communicates with a passage for the supply of lubricant, the upper face of the lower plate of such pair being substantially even. The invention has for its purpose in such laminated springs to render possible an efficient lubrication of the sliding surfaces of the spring plates, and with this purpose in view the invention consists in that the spring plates are provided on their upper sides with bent-up or elevated edges or ribs at their longitudinal sides as well as with elevated or raised portions at both ends, which ribs and portions are adapted to enter and engage corresponding recesses in the lower face of the adjacent upper and longer spring plate. By this arrangement the lubricant flowing from the groove in the lower face of the upper spring plate will be retained on the even upper face of the lower spring plate between said ribs and said raised portions, so that good and efficient lubrication of the sliding surfaces of the spring plates is obtained, since the lubricant will be spread out over the entire even surface mentioned.

Figure 1:
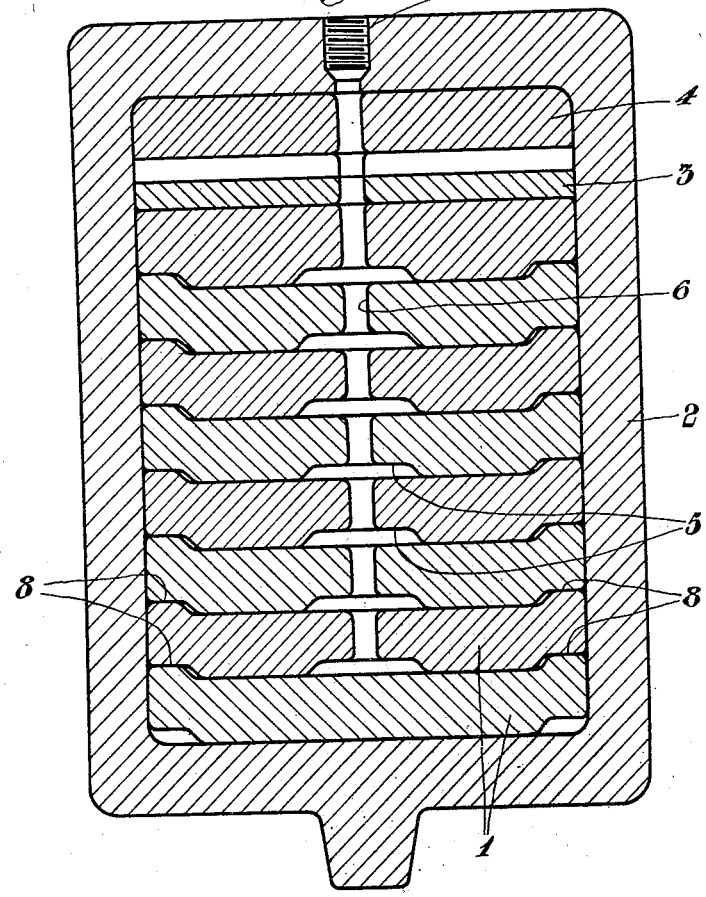
Figure 3:
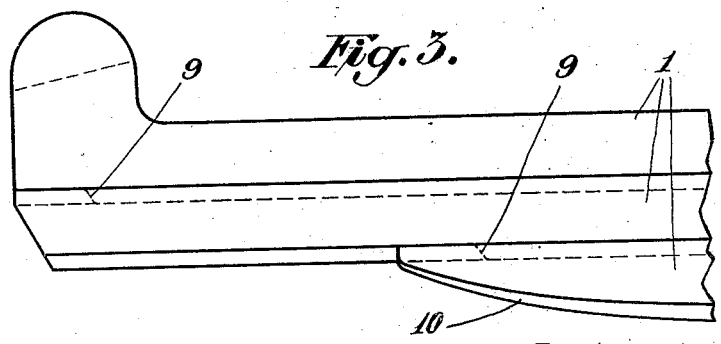

In the accompanying drawings an embodiment of the invention is illustrated by way of example. Fig. 1 shows a cross section of a supporting spring according to the invention, and Fig. 2 shows the middle portion of the spring in side view, while Fig. 3 shows one end of the spring. Fig. 4 is a side view of the spring.

The spring illustrated in the drawing consists of eight leaves or plates 1 placed on top of each other, and the length of which increases from below upwards in the usual manner, said plates being surrounded and held together at the middle by a bridle or buckle 2 in which the spring plates are retained by means of two wedges 3 and 4. Each spring plate 1, with the exception of the lowermost plate, is provided in its lower face with a longitudinal groove 5 which is placed midway between the side edges of the plate, and which preferably extends along the entire length of the plate. Said grooves communicate at the midpoints of the spring plates with a lubrication passage 6 which is formed of holes placed above each other in the spring plates 1—with the exception of the lowest plate—and in the two wedges 3 and 4, as well as in the upper cross piece of the buckle 2, which latter is provided with a bore 7 in which a suitable grease cup or lubricator nipple may be secured. When lubricant is forced in through such cup or nipple such lubricant passes from the vertical passage 6 out into all grooves 5, from which it passes out to the sliding surfaces between the spring plates.

In order to retain the lubricant on the even upper surfaces of the spring plates and to prevent it from passing out to the sides between the spring plates 1, said plates are provided at their longitudinal sides with bent-up or pressed-up edges or ribs 8, as clearly shown in Fig. 1. The spring plates 1 are also provided at both ends with raised portions or projections 9 which are adapted to enter and engage the grooves in the lower faces of the adjacent upper spring plates. In this manner the lubricant is prevented from passing out at the sides as well as at the ends and an efficient lubrication of the spring plates is obtained, so that the friction between the plates is reduced, whereby increased resiliency of the spring and a quite considerable increase of its life is obtained and the advantage is also attained that the ends of the plates are prevented from displacement laterally relatively to one another. In order to obtain a good bearing of the ends of the spring plates and a secure engagement of the projections 9 with the grooves, the lower surfaces of the ends of the spring plates are formed along parabolical curves at 10.

The embodiment above described and illustrated in the drawing is only to be regarded as an example, and it will be understood that its details may be modified in several ways without departing from the principle and scope of the invention as defined in the following claims.

I claim:

1. In a laminated spring, the combination of a number of spring plates placed on top of each other, the upper spring plate of a pair of adjacent plates being provided with a longitudinal groove in its lower face, and the lower spring plate of such pair being provided with an even upper face, a lubricating passage communicating with said groove between said adjacent plates, said spring plates having bent-up edges at their longitudinal sides and projections at their ends and having recesses in their lower faces, said edges and projections on one spring plate being adapted to engage said recesses and said groove in the adjacent upper spring plate.

2. In a laminated spring, the combination of a number of spring plates placed on top of each other, the upper spring plate of a pair of adjacent plates being provided in its lower face with a longitudinal groove and with recesses along its edges, and the lower spring plate of such pair being provided with a substantially even upper face having elevated ribs along its longitudinal edges and elevated portions at both ends, said ribs and said portions on said lower spring plate being adapted to enter and engage said recesses and said groove respectively in the lower face of the upper adjacent spring plate of such pair, and a passage for lubricant communicating with said groove between said adjacent plates.

ÅKE OSKAR GYLLING.